United States Patent [19]

Fukushima et al.

[11] Patent Number: 4,681,645
[45] Date of Patent: Jul. 21, 1987

[54] METHOD AND APPARATUS FOR FUSING TOGETHER THE BOTTOM OF TUBULAR CONTAINER FORMED OF SYNTHETIC RESIN

[75] Inventors: Shoji Fukushima; Motosaburo Kato; Takashi Mochizuki; Yukio Wada, all of Shizuoka, Japan

[73] Assignee: Pola Chemical Industries, Inc., Shizuoka, Japan

[21] Appl. No.: 762,820

[22] Filed: Aug. 5, 1985

[30] Foreign Application Priority Data

Aug. 7, 1981 [JP] Japan .................................. 56-123692
May 24, 1982 [JP] Japan .................................. 57-87765

[51] Int. Cl.⁴ ............................................. B32B 31/26
[52] U.S. Cl. ................................. 156/73.1; 156/304.5; 156/535; 156/580.2; 53/484; 53/479; 264/296; 264/320
[58] Field of Search ............................ 156/73.1–73.3, 156/580.1, 580.2, 304.2, 304.5, 535; 53/373, 379, 481, 484, DIG. 2, 479; 65/108; 29/33 D; 264/209.3, 23, 296, 320; 72/274

[56] References Cited

U.S. PATENT DOCUMENTS

| | | | |
|---|---|---|---|
| 2,102,357 | 12/1937 | Dichter | 65/108 |
| 2,762,421 | 9/1956 | Quinche et al. | 156/198 |
| 3,242,029 | 3/1966 | Deans | 156/580.2 |
| 3,468,731 | 9/1969 | Obeda | 156/73.1 |
| 3,499,808 | 3/1970 | Obeda | 156/580.2 |
| 3,822,465 | 7/1974 | Frankort et al. | 156/73.2 |
| 3,905,280 | 9/1975 | Engleston | 156/580.1 |
| 4,075,820 | 2/1978 | Standley | 156/580.1 |
| 4,145,236 | 3/1979 | Neumayer et al. | 156/580.2 |
| 4,159,220 | 6/1979 | Bosche et al. | 156/580.2 |
| 4,187,768 | 2/1980 | Suzuki | 156/580.1 |
| 4,251,303 | 2/1981 | Deimel et al. | 156/580.2 |
| 4,412,966 | 11/1983 | Yoshino | 269/296 |

OTHER PUBLICATIONS

Branson 'Ultrasonic Assembly,' 1972, by Branson Sonic Power Company.
Branson 'Applications Brief #4', 5/76 by Branson Sonic Power Company.

Primary Examiner—Donald E. Czaja
Assistant Examiner—Merrell C. Cashion, Jr.
Attorney, Agent, or Firm—Beveridge, DeGrandi & Weilacher

[57] ABSTRACT

A method for fusing together the bottom of a charged tubular container, formed of a synthetic resin, with its mouth being turned down, comprising the steps of:
engaging a flattened portion of the upper end of said tubular container with one side of a vibrator terminal provided at the lower end of an ultrasonic generator oscillating at a given angle to said flattened portion, and
applying ultrasonic vibrations on said one side of said terminal, thereby applying said ultrasonic vibrations on said flattened portion.

4 Claims, 6 Drawing Figures

METHOD AND APPARATUS FOR FUSING TOGETHER THE BOTTOM OF TUBULAR CONTAINER FORMED OF SYNTHETIC RESIN

BACKGROUND OF THE INVENTION

The present invention relates to a method and apparatus for fusing together the bottom of a tubular container formed of a synthetic resin for a short period of time and with high productivity but with little or no noise during fusing.

In the prior art, synthetic resin tubes which had been charged have been fused together at their bottom by applying ultrasonic waves on the faces to be fused together in a direction perpendicular thereto or parallel therewith.

With the application of ultrasonic vibrations on the faces to be fused together in a direction perpendicular thereto, fusing is impossible, or effected with reduced fusing strength, when the content is deposited onto the faces. In the latter case, a part of the synthetic resin forming the faces to be fused together is powdered and scattered in the content, leading to its deterioration.

With the application of ultrasonic vibration on the faces to be fused together in a direction parallel therewith, on the other hand, the faces to be fused together are burred, resulting in a lowering of quality. Fusing is also effected in an unsatisfactory working atmosphere with unpleasant frictional noise. In addition, a time required for fusing is so long that productivity drops.

SUMMARY OF THE INVENTION

It is therefore a main object of the present invention to provide a method for fusing together the bottom of a charged tubular container, formed of a synthetic resin, with its mouth being turned down, comprising the steps of engaging a flattened portion of the upper end of said tubular container with one side of a vibrator terminal provided at the lower end of an ultrasonic generator oscillating at a given angle to said flattened portion, and applying ultrasonic vibrations on said one side of said terminal, thereby applying said ultrasonic vibrations on said flattened portion.

Another object of the present invention is to provide an arrangement for fusing together the bottom of a charged tubular container, formed of a synthetic resin, with its mouth being turned down, comprising an ultrasonic generator oscillating at a given angle to the longitudinal direction of said tubular container, a guide means provided on the edge of a support base for flattening the upper end of said tubular container, a plate movable forward and rearward on said support base, and an elevator means disposed between a vibrator terminal provided at the lower end of said ultrasonic generator and said plate for inserting the upper end of said tubular container through a through-hole formed in said guide means.

A further object of the present invention is to provide the above-mentioned arrangement wherein the terminal is provided in its end face with a groove facing the upper edge of the guide means.

The powdery or particulate synthetic resin forming the flattened portion is prevented from being scattered in the content of the tubular container, and the content is not deteriorated. Fusing is carried out with increased fusing strength without any difficulty, even when the content is deposited onto the faces to be fused together. In addition, the fused portion is by no means burred with pleasant appearance being obtained as a consequence. Furthermore, fusing can be effected with high productivity and with little or no unpleasant frictional noise.

BRIEF DESCRIPTION OF THE DRAWINGS

The present invention will now be explained with reference to the accompanying drawings wherein like numerals indicate like parts throughout several drawings, and wherein.

Figure 1:
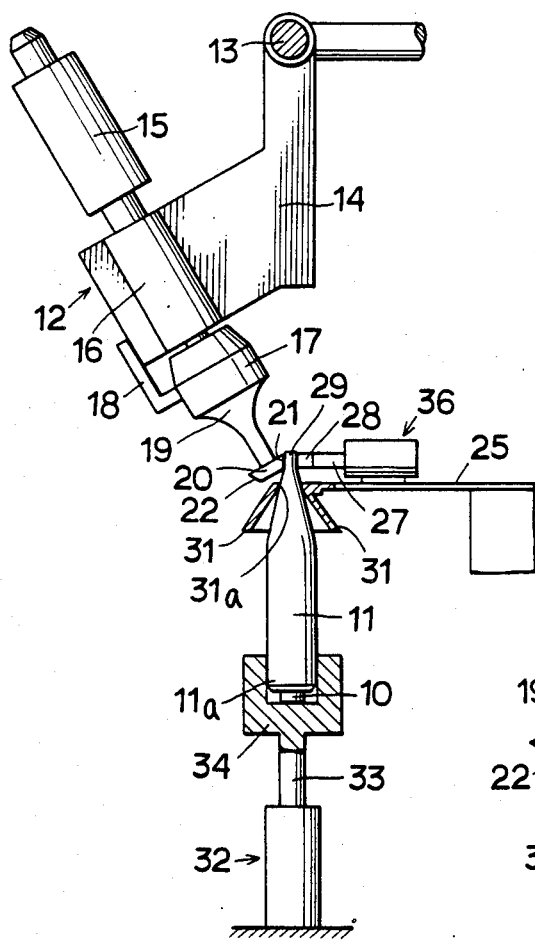
FIG. 1 is a side view, partly cut away, of the arrangement of the present invention.
Figure 2:
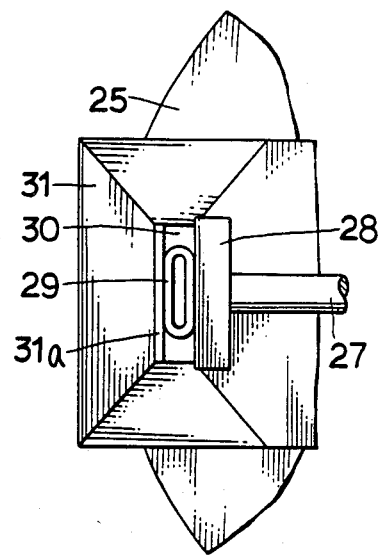
FIG. 2 is a partly enlarged plan view of the support base.
Figure 3:
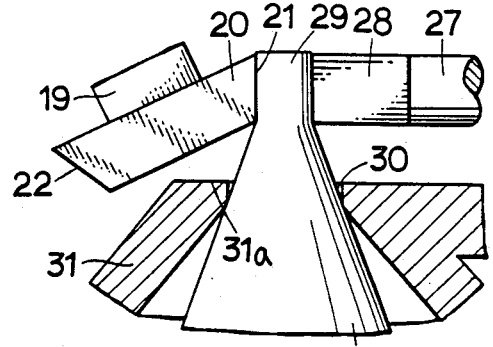
FIG. 3 is an enlarged side view, partly cut away, of part of the present invention.

The present invention will now be explained with reference to one preferred embodiment illustrated in FIGS. 1 through 4 inclusive.

The tubular containers referred to herein include, but are not restricted to, those comprising various synthetic resins such as polyethylene, polyamide (nylon) or polypropylene, either alone or in combination, or alternatively an aluminium foil having on both its sides the above-mentioned resin(s), and may be 0.2–0.7 mm and 10–60 mm in thickness and width, respectively. The tubes may have a suitable length depending upon particular applications. The amplitude and frequency of ultrasonic waves generated by an ultrasonic generator to be described later may be on the order of 0.05–0.25 mm and 15 KHz or higher, respectively.

An ultrasonic generator, generally shown at 12, is disposed an angle of 1° to 89°, preferably 10° to 45°, with respect to the longitudinal direction of a charged tubular container made of a synthetic resin, generally shown at 11, with its opening or mouth 10 being turned down. The generator is pivotally and horizontally slidably supported on a rod 13 through its supporting arm 14, and includes an oscillator 15, an amplifier 16, a vibrator 17, a vibrator stopper rod 18, a horn means 19, a vibrator terminal 20 and so on. The vibrator terminal 20 is of an inverted frustum, and has its right and left engaging sides 21 and 22 extending at an angle of 0° to 45°, which is the same as the oscillation direction of ultrasonic waves, and marks 23 and knurls 24 to be transferred onto the bottom portion of the tube 11 to be fused together.

A plate 28 is attached to the end of a rod 27 extenidng from an engaging device 36 fixed on a support base 25 held by suitable means and comprised of a hydraulic cylinder, a pneumatic cylinder, a cam and so on. The device 36 is used to engage the end of the flattened portion of the tube 11 with the side 21 or 22 of the vibrator terminal 20, as will be described later. The support base 25 is provided with an umbrella-like guide means 31 having therein a rectangular through-hole 30 which serves to flatten at 29 the bottom of the tubular container 1!. A clamp means 34 for clamping the shoulder 11a of the tubular container 11 is formed at the upper end of a rod 33 adapted to be ascended and descended by an elevator device 32 comprised of a hydraulic cylinder, a pneumatic cylinder, a cam and so on, and adapted to bring up and down the tubular container 11.

The arrangement according to the present invention operates as follows:

The rod 27 and the plate 28 are moved rearward by actuation of the engaging device 36, while the rod 33 and the clamp means 34 are moved downward by actuation of the elevator device 32. The charged tube 11 is inserted at its shoulder 11a in the clamp means 34, and held therein. Subsequent actuation of the elevator device causes the rod 33 and the clamp means 34 to ascend, so that the cylindrical bottom of the tube 11 is introduced in the umbrella-like guide means 31 where it is successively flattened, and passes through and projects from the rectangular through-hole 30. When the upper end of the projecting flattened bottom portion 29 is coincident with the upper edge of the plate 28, ascending of the elevator device 32 is stopped. Thereupon, the engaging device 36 is actuated to cause forward movement of the rod 27 and the plate 28 for the engagement of the end of the flattened portion 29 of the tube 11 with the side 21 of the vibrator terminal 20 of the ultrasonic generator 12. Subsequent energizing of the oscillator 15 of that generator 12 causes ultrasonic vibrations to be applied on the flattened bottom portion 29 held between the side 21 of the vibrator terminal 20 and the plate 28 at a given angle thereto, whereby the flattened portion 29 is fused together, while the marks 23 and the knurls 24 are transferred onto the outer surfaces of the flattened portion 29. If a mark and a knurl are provided on the surface of the plate 28 to be in engagement with the flattened portion 29, they are transferred onto the outer surface of that portion as well.

According to the present invention, ultrasonic vibrations are applied on the flattened bottom portion 29 of the tube 11 held between the engaging side 21 of the vibrator terminal 20 and the plate 28 at a given angle thereto, whereby the flattened portion 29 is fused together. This prevents the powdery or particulate synthetic resin forming the flattened portion 29 from being scattered in the content of the tube owing to ultrasonic vibrations during fusing, and, thus, that content from being deteriorated. Fusing is carried out with increased fusing strength without any difficulty, even when the content is deposited onto the inner faces of the flattened portion 29. In addition, the fused portion is by no means burred with pleasant appearance being obtained as a consequence. Furthermore, fusing can be effected with high productivity and in a good working atmosphere with little or no unpleasant frictional noise. When the engaging side 21 of the vibrator terminal 20 wears off, the vibrator 17 may be removed from the amplifier 16, and fixed thereto at the opposite unworn side 22 which now serves as an engaging side. Thus, the vibrator 17 having the terminal 20 can be used over extended periods of time in a good condition.

Figure 5:
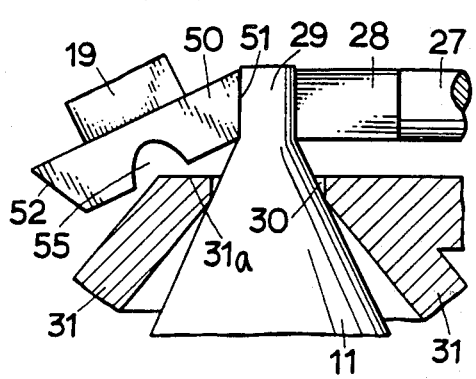
FIG. 5 is an enlarged side view, partly cut away, of part of another embodiment of the present invention.
Figure 4:
FIG. 4 is a bottom view of the vibrator terminal.
Figure 6:
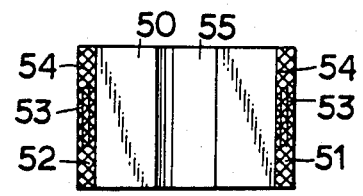
FIG. 6 is a bottom view of the vibrator terminal of FIG. 5.

FIGS. 5 and 6 show another embodiment of the present invention, which is substantially similar to the first embodiment, except for the configuration of the bottom of the vibrator terminal 20.

A vibrator terminal 50 is provided in its bottom with a groove 55 which faces the upper edge 31a of the guide means 31 adjacent thereto. The terminal 50 is provided at its right and left sides with marks 52 and knurls 54.

According to the second embodiment of the present invention, the groove 55 formed in the bottom of the terminal 50 causes that terminal to give access to the upper edge 31a of the guide means 31. That is a distance that the flattend portion 29 to be fused together projects from the through-hole 30 may he just the width of the potion 29 to be fused. This permits the flattened portion 29 to be reduced in length. Furthermore, an amount of air remaining in the bottom of the synthetic resin-made, tubular container 11 can be minimized to such an extent that the oxidation of the content is avoided. Thus, the tubular container 11 can be reduced in length in its entirety, leading to a considerably saving of material.

What is claimed is:

1. A method for fusing together the bottom of a tubular container made of synthetic resin, which comprises:

clamping a shoulder of a cylindrical and tubular container which is filled in with its charge and formed of flexible synthetic resin which is capable of being fused by ultrasonic vibrations in clamp means formed at the upper end of a movable rod of an elevator device, said container having its mouth closed by a cap in an openable manner and positioned downwardly, forcing the upper end of said tubular container into a rectangular and horizontal through-hole formed in the top edge of a downward umbrella-shaped guide formed as one piece by means of said elevator device, thereby to define a flattened portion on the upper end of said tubular container, said flattened portion having its inner faces spaced apart from each other, and successively flattening the upper end of said tubular container by continuing said forcing of the upper end of said tubular container into said rectangular and horizontal through hole, said forcing continuing until the flattened portion extends completely above said through hole and until the upper end of said tubular container is coincident with the upper edge of plate means movable in a horizontal plane, urging said flattened portion projecting from the upper end of said umbrella-shaped guide against a flat urging face of a vibratory terminal formed at the end of a horn portion of an ultrasonic generator which generates ultrasonic waves oscillating in the direction extending at an angle of 10°–45° with respect to the lengthwise direction of said tubular container, said urging being carried out with the use of said plate means formed at the end of a horizontally movable rod of an urging device, thereby to bring said spaced apart inner faces into close contact with each other, said flat urging face of said ultrasonic generator being parallel with the said flattened portion and said flattened portion being positioned completely between said plate means and said flat urging face, and applying ultrasonic waves by said generator to said flattened portion projecting from the upper end of said umbrella-shaped guide and having its inner faces brought into close contact with each other, whereby the inner faces of said flattened portion are fused together.

2. An arrangement for fusing together the bottom of a tubular container made of synthetic resin, comprising:

an elevator device, including a vertically movable rod having at its upper end clamp means for clamping a shoulder of a cylindrical and tubular container which is filled in with its charge, and formed of flexible synthetic resin capable of being fused by ultrasonic vibrations, said container having its mouth closed by a cap in an openable manner and positioned downwardly, a downward umbrella-shaped guide formed as one piece fixed to a support, including on the top portion a rectangular and horizontal through-hole adapted for forming a flattened portion on the upper end of said tubular container, when said tubular container is forced through said through hole, said elevator device and said rod, being positioned below said guide, and being adapted to act cooperatively to cause said rod to move upwardly so as to enable the tubular container to be successively flattened, said rod being of a length to be capable of being extended a sufficient distance to enable the tube end to be forced through said through hole, a vibratory terminal formed at the end of a horn of an ultrasonic generator which generates ultrasonic waves oscillating in the direction extending at an angle of 10°-45° with respect to the lengthwise direction of said tubular container, said terminal being located above said umbrella-shaped gudie and being provided with rectangular faces formed on the sides of said terminal adapted for parallel contacting the surface of the flattened portion formed at the upper end of said tubular container an urging rectangular plate formed at the end of an urging movable rod of an urging device fixed to said support, said plate facing said rectangular face on said terminal and adpated for coming into parallel surface contact with said flattened portion projecting from the uppe edge of said umbrella-shaped guide and coming into surface contact with said flattened portion, thereby being capable of fusing together the inner faces of said flattened portion, said ultrasonic wave generator having its vibratory terminal formed on the sides into a trapezoidal shape and a lower horn portion to the end of which said urging faces are detachably and rotatably attached, said urging face coming into surface contact with said flattened portion formed at the upper end of said tubular container.

3. The arrangement as recited in claim 2, wherein said vibrator terminal provided at the lower end of said ultrasonic generator is of an inverted frustum, and has both its sides extending at an angle of 10° to 45°, which is the same as the angular direction at which the oscillations are generated.

4. The arrangement as recited in claim 3, wherein said vibrator terminal provided at the lower end of the said ultrasonic generator is provided in its bottom with a groove which is in parallel with the upper edge of the said guide means adjacent to said terminal.

* * * * *